US009880536B1

(12) United States Patent
Sullam et al.

(10) Patent No.: US 9,880,536 B1
(45) Date of Patent: *Jan. 30, 2018

(54) AUTONOMOUS CONTROL IN A PROGRAMMABLE SYSTEM

(71) Applicant: Cypress Semiconductor Corporation, San Jose, CA (US)

(72) Inventors: Bert S. Sullam, Bellevue, WA (US); Harold M. Kutz, Edmonds, WA (US); Monte Mar, Issaquah, WA (US); Eashwar Thiagarajan, Bothell, WA (US); Timothy Williams, Bellevue, WA (US); David G. Wright, Woodinville, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/865,824

(22) Filed: Sep. 25, 2015

Related U.S. Application Data

(63) Continuation of application No. 12/765,400, filed on Apr. 22, 2010, now Pat. No. 9,448,964.

(60) Provisional application No. 61/175,086, filed on May 4, 2009.

(51) Int. Cl.
  *G06F 15/177* (2006.01)
  *G05B 19/042* (2006.01)
  *H04L 29/08* (2006.01)
  *H04L 29/06* (2006.01)

(52) U.S. Cl.
  CPC .. *G05B 19/042* (2013.01); *G05B 2219/25257* (2013.01); *H04L 29/06* (2013.01); *H04L 29/08981* (2013.01)

(58) Field of Classification Search
  None
  See application file for complete search history.

(56) References Cited

U.S. PATENT DOCUMENTS

| | | | |
|---|---|---|---|
| 6,651,129 B1 * | 11/2003 | Smith | G01R 31/3167 710/316 |
| 6,724,220 B1 * | 4/2004 | Snyder | G06F 1/08 326/38 |
| 6,898,703 B1 | 5/2005 | Ogami et al. | |
| 6,915,416 B2 | 7/2005 | Deng et al. | |
| 6,981,090 B1 | 12/2005 | Kutz et al. | |
| 7,221,187 B1 * | 5/2007 | Snyder | G06F 1/08 326/41 |

(Continued)

OTHER PUBLICATIONS

International Search Report for International Application No. PCT/US10/33626 dated Jun. 24, 2010; 2 pages.

(Continued)

*Primary Examiner* — Razu A Miah

(57) ABSTRACT

A programmable system includes a programmable analog system that is reconfigurable to perform various analog operations, and includes a programmable digital system that is reconfigurable to perform various digital operations. The programmable system also includes a microcontroller capable of reconfiguring and controlling the programmable analog system and the programmable digital system. The programmable digital system is configured to control the programmable analog system autonomously of the microcontroller.

13 Claims, 6 Drawing Sheets

(56) References Cited

U.S. PATENT DOCUMENTS

| | | | |
|---|---|---|---|
| 7,256,610 B1 | 8/2007 | Balasubramanian et al. | |
| 7,299,307 B1 | 11/2007 | Early et al. | |
| 7,360,005 B2 | 4/2008 | Lin | |
| 7,406,674 B1 | 7/2008 | Ogami et al. | |
| 7,612,582 B2 | 11/2009 | Ward | |
| 7,613,943 B2 | 11/2009 | Bakker et al. | |
| 7,937,683 B1 | 5/2011 | Herbst | |
| 8,296,480 B2* | 10/2012 | Noeldner | G06F 12/00 710/22 |
| 8,487,655 B1 | 7/2013 | Kutz et al. | |
| 2002/0108006 A1* | 8/2002 | Snyder | G06F 1/08 710/100 |
| 2003/0086422 A1* | 5/2003 | Klinker | H04L 29/06 370/389 |
| 2003/0120977 A1 | 6/2003 | Tang | |
| 2003/0140153 A1 | 7/2003 | Lawrence | |
| 2004/0016002 A1* | 1/2004 | Handelman | G06F 17/5054 725/152 |
| 2004/0093538 A1 | 5/2004 | Hester et al. | |
| 2004/0122938 A1* | 6/2004 | Messick | H04L 47/283 709/224 |
| 2004/0168099 A1 | 8/2004 | Vorbach et al. | |
| 2004/0246047 A1* | 12/2004 | Manku | H03D 7/1441 329/315 |
| 2005/0131645 A1 | 6/2005 | Panopoulos | |
| 2006/0101116 A1 | 5/2006 | Rittman et al. | |
| 2007/0192863 A1* | 8/2007 | Kapoor | G06F 9/505 726/23 |
| 2008/0031135 A1 | 2/2008 | Pok et al. | |
| 2008/0043719 A1 | 2/2008 | Pok et al. | |
| 2008/0058962 A1 | 3/2008 | Ward | |
| 2008/0258760 A1* | 10/2008 | Sullam | H03K 19/177 326/38 |
| 2008/0288639 A1* | 11/2008 | Ruppert | G06F 8/60 709/225 |
| 2008/0294806 A1 | 11/2008 | Swindle et al. | |
| 2008/0297167 A1* | 12/2008 | Possa | G01R 31/2803 324/537 |
| 2009/0013193 A1* | 1/2009 | Matsuzaki | H04L 9/0891 713/189 |
| 2009/0089599 A1 | 4/2009 | Westwick et al. | |
| 2009/0132821 A1* | 5/2009 | Matsuzaki | H04L 9/0877 713/170 |
| 2009/0196385 A1 | 8/2009 | Hunter et al. | |
| 2009/0248535 A1 | 10/2009 | Fisher et al. | |
| 2009/0281783 A1 | 11/2009 | Bitar et al. | |
| 2009/0319647 A1 | 12/2009 | White et al. | |
| 2011/0113361 A1 | 5/2011 | Bhatt et al. | |
| 2011/0191405 A1 | 8/2011 | Boruhovski et al. | |
| 2011/0257936 A1 | 10/2011 | Kulik et al. | |
| 2011/0283057 A1* | 11/2011 | Snyder | G06F 1/08 711/103 |
| 2012/0086471 A1* | 4/2012 | Snyder | G06F 1/08 326/38 |

OTHER PUBLICATIONS

SIPO Office Action for Application No. 201080001151.9 dated Dec. 25, 2014; 8 pages.
USPTO Advisory Action for U.S. Appl. No. 12/765,400 dated Oct. 17, 2012; 3 pages.
USPTO Final Rejection for U.S. Appl. No. 12/765,400 dated Aug. 7, 2012; 14 pages.
USPTO Non Final Rejection for U.S. Appl. No. 12/765,400 dated Apr. 13, 2012; 17 pages.
USPTO Non Final Rejection for U.S. Appl. No. 12/765,400 dated Apr. 29, 2014; 15 pages.
USPTO Notice of Allowance for U.S. Appl. No. 12/765,400 dated Jun. 5, 2015; 10 pages.
USPTO Notice of Allowance for U.S. Appl. No. 12/765,400 dated Aug. 29, 2014; 8 pages.
USPTO Notice of Allowance for U.S. Appl. No. 12/765,400 dated Oct. 7, 2015; 9 pages.
USPTO Notice of Allowance for U.S. Appl. No. 12/765,400 dated Dec. 5, 2014; 11 pages.
Written Opinion of the International Searching Authority for International Application No. PCT/US10/33626 dated Jun. 24, 2010; 5 pages.
SIPO Office Action for Application No. 201080001151.9 dated Sep. 29, 2015; 2 pages.
SIPO Office Action for Application No. 201080001151.9 dated Apr. 3, 2015; 3 pages.
SIPO Office Action for Application No. 201080001151.9 dated Mar. 25, 2014; 4 pages.
SIPO Office Action for Application No. 201080001151.9 dated Jul. 2, 2013; 4 pages.

* cited by examiner

AUTONOMOUS CONTROL IN A PROGRAMMABLE SYSTEM

CROSS-REFERENCE TO RELATED APPLICATIONS

This application is a continuation of U.S. patent application Ser. No. 12/765,400, filed Apr. 22, 2010, which claims priority to U.S. Provisional Patent Application No. 61/175,086 filed May 4, 2009, all of which are incorporated by reference herein in their entirety.

TECHNICAL FIELD

This disclosure relates generally to electronic circuits, and, more particularly, to autonomous control in a programmable system.

BACKGROUND

Many electronic systems include circuits that provide fixed functionality. For instance, a signal processing device can include fixed function circuits, such as signal filters and analog-to-digital converters, to perform signal processing operations. By arranging these fixed-function circuits in particular configurations, electronic systems can be built to perform specific tasks.

Programmable electronic systems include more generalized circuits or blocks, such as digital and analog programmable blocks, that can be configured to implement a large number of peripherals. The digital blocks can include programmable circuitry configured to provide various digital functions. The analog blocks can be used for development of analog elements, such as analog filters, comparators, inverting amplifiers, as well as analog-to-digital and digital-to-analog converters. The programmable electronic system can combine the analog and digital blocks to form a wide variety of functional modules, which implement mixed-signal applications.

The programmable electronic systems include a microcontroller and firmware to control applications performed by the programmable analog blocks and programmable digital blocks. For instance, when the programmable electronic system implements a mixed-signal application, such as an analog-to-digital converter, the microcontroller and firmware can configure or reconfigure the programmable analog blocks and programmable digital blocks into an analog-to-digital converter configuration, control the routing of analog data (to be converted) to the programmable analog blocks, control the output of digital (converted) data from the programmable digital blocks, and possibly receive status, state, and mode signaling from the programmable analog blocks and programmable digital blocks during performance of the analog-to-digital conversion.

SUMMARY

This patent application discloses a system that includes a programmable analog system that is reconfigurable to perform various analog operations, and includes a programmable digital system that is reconfigurable to perform various digital operations. The system also includes a microcontroller capable of reconfiguring and controlling the programmable analog system and the programmable digital system. The programmable digital system is configured to control the programmable analog system autonomously of the microcontroller.

In some embodiments, a method includes receiving configuration data that prompts a digital system to implement a digital control device and sending, with the digital control device, one or more commands to an analog system over an interconnect controlled by the digital control device. The one or more commands are configured to prompt a reconfiguration of the analog system. The method further includes controlling, with the digital control device, analog data operations performed by the reconfigured analog system independently of a microcontroller.

In some embodiments, a system includes a programmable analog system including one or more analog circuits that are reconfigurable to perform analog data operations. The system further includes a programmable digital system including one or more universal digital block devices that are reconfigurable to perform digital data operations. At least one of the universal digital block devices is reconfigured to implement a digital control device that controls the programmable analog system.

DETAILED DESCRIPTION

A Programmable System-on-Chip (PSoC™), such as that used in the PSoC™ family of products offered by Cypress Semiconductor Corporation (San Jose, Calif.), or other electronic system can include a core processing device and programmable analog and digital components that can work in conjunction to perform various data operations. The programmable digital components can be configured into a digital control device, which can control the operations performed by the programmable analog and digital components autonomously of the core processing device. Embodiments are shown and described below in greater detail.

Figure 1:
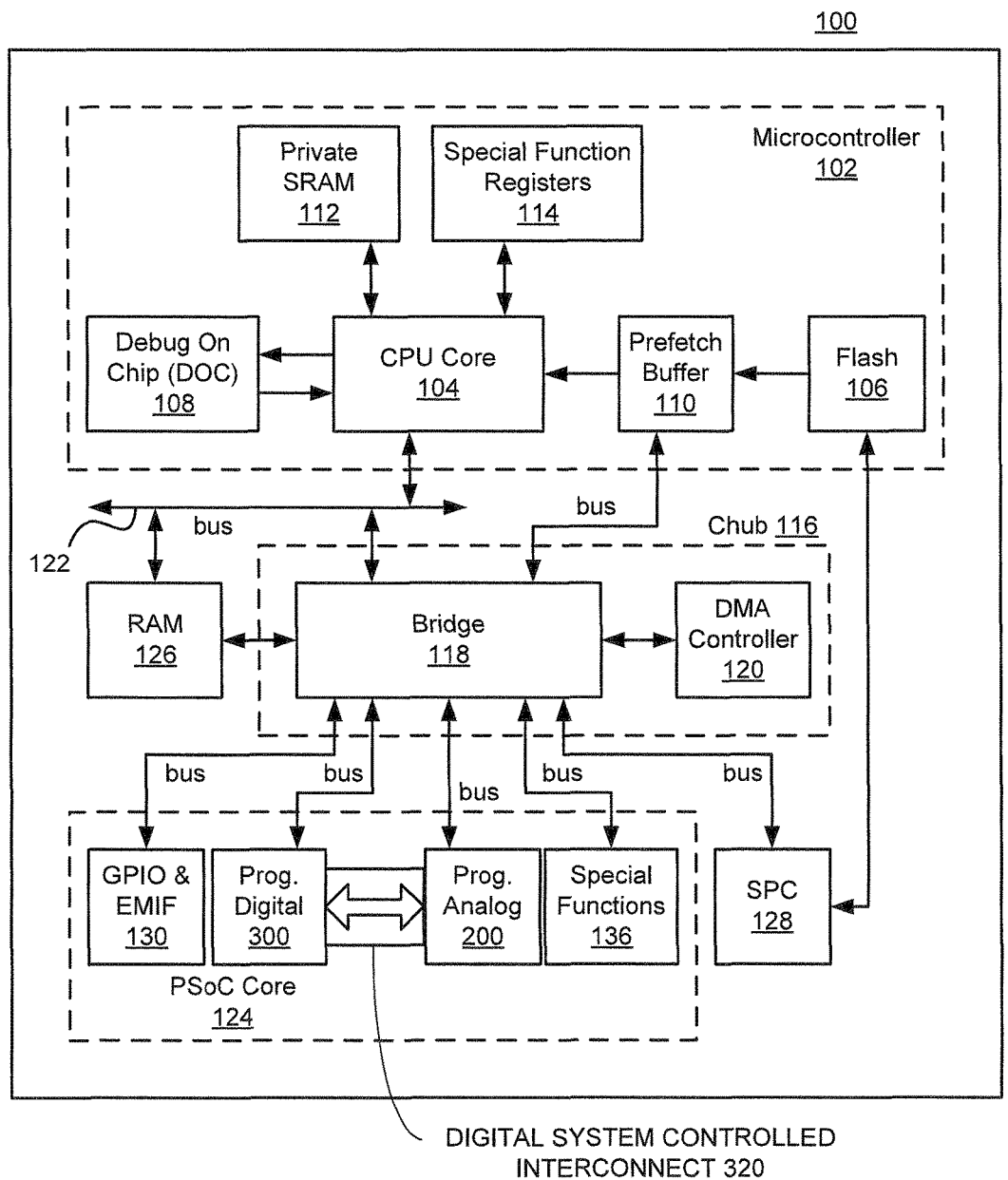
FIG. 1 illustrates an embodiment of a core architecture of a Programmable System-on-Chip (PSoC™), such as that used in the PSoC3™ family of products offered by Cypress Semiconductor Corporation (San Jose, Calif.).

FIG. 1 illustrates an embodiment of a core architecture 100 of a Programmable System-on-Chip (PSoC™), such as that used in the PSoC3™ family of products offered by Cypress Semiconductor Corporation (San Jose, Calif.). Referring to FIG. 1, in one embodiment, the core architecture 100 includes a microcontroller 102. The microcontroller 102 includes a CPU (central processing unit) core 104, flash program storage 106, DOC (debug on chip) 108, a prefetch buffer 110, a private SRAM (static random access memory) 112, and special functions registers 114. In an embodiment, the DOC 108, prefetch buffer 110, private SRAM 112, and special function registers 114 are coupled to the CPU core 104, while the flash program storage 106 is coupled to the prefetch buffer 110.

The core architecture 100 may also include a CHub (core hub) 116, including a bridge 118 and a DMA (direct memory access) controller 120, that is coupled to the microcontroller 102 via bus 122. The Chub 116 may provide the primary data and control interface between the microcontroller 102 and its peripherals and memory, and a programmable core 124. The DMA controller 120 may be programmed to transfer data between system elements without burdening the CPU core 104. In various embodiments, each of these subcomponents of the microcontroller 102 and CHub 116 may be different with each choice or type of CPU core 104. The Chub 116 may also be coupled to shared SRAM 126 and an SPC (system performance controller) 128. The private SRAM 112 is independent of the shared SRAM 126 that is accessed by the microcontroller 102 through the bridge 118. The CPU core 104 accesses the private SRAM 112 without going through the bridge 118, thus allowing local register and RAM accesses to occur simultaneously with DMA access to shared SRAM 126. Although labeled here as SRAM, these memory modules may be any suitable type of a wide variety of (volatile or non-volatile) memory or data storage modules in various other embodiments.

In various embodiments, the programmable core 124 may include various combinations of subcomponents (not shown), including, but not limited to, a digital logic array, digital peripherals, analog processing channels, global routing analog peripherals, DMA controller(s), SRAM and other appropriate types of data storage, JO ports, and other suitable types of subcomponents. In one embodiment, the programmable core 124 includes a GPIO (general purpose JO) and EMIF (extended memory interface) block 130 to provide a mechanism to extend the external off-chip access of the microcontroller 102, a programmable digital system 300, a programmable analog system 200, and a special functions block 136, each configured to implement one or more of the subcomponent functions. In various embodiments, the special functions block 136 may include dedicated (non-programmable) functional blocks and/or include one or more interfaces to dedicated functional blocks, such as USB, a crystal oscillator drive, JTAG, and the like. The system resources 130 can also include a memory device (not shown) to store configuration data.

The programmable digital system 300 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital system 300 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 104) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 102200 BAUD and after detection to generate required clock to generate BAUD rate); and any other suitable type of digital function or combination of digital functions which can be implemented in a plurality of UDBs.

As will be described below in greater detail, the digital system 300 can also be configured to implement a digital control device, which can control the analog system 200 and the digital system 300 autonomously of the microcontroller 102. The configuration data can be any combination of commands and/or data that, when provided to the digital system 300, causes the digital system 300 to implement a digital control device that is capable of controlling the operations in the analog system 200 and the digital system 300 independently of the microcontroller 102.

The programmable analog system 200 may include analog resources including, but not limited to, comparators, mixers, PGAs (programmable gain amplifiers), TIAs (transimpedance amplifiers), ADCs (analog-to-digital converters), DACs (digital-to-analog converters), voltage references, current sources, sample and hold circuits, and any other suitable type of analog resources. The programmable analog system 200 may support various analog functions including, but not limited to, analog routing, LCD drive IO support, capacitive sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

The analog system 200 and the digital system 300 can be reconfigured and their operation controlled responsive to commands and/or data from the microcontroller 102, the analog system 200, and/or the digital system 300, e.g., when the digital system 300 is configured into the digital control device. The microcontroller 102 can provide commands to the analog and digital systems 200 and 300 via one or more buses, which prompts the analog and digital systems 200 and 300 to configure their reconfigurable analog circuits and the programmable digital circuits, respectively. The microcontroller 102 can subsequently control operations performed by the configured components of the analog and digital systems 200 and 300 and provide the analog and digital systems 200 and 300 data to be processed.

When the digital system 300 is configured into the digital control device, the digital system 300 can control the operation of the analog system 200 and the digital system 300 autonomously of the microcontroller 102. Thus, the analog system 200 and the digital system 300 can be reconfigured and their operations controlled responsive to commands and/or data from the digital system 300 configured as the digital control device. In some embodiments, the digital control device can also control operations of the special functions block 136. By configuring the digital system 300 into the digital control device, the digital system 300 can configure and control the analog and digital systems 200 and 300, which reduces the processing load of the microcontroller 102.

Once configured by the microcontroller 102, the digital control device, or in response to commands from the memory device, the analog system 200 can provide feedback and/or control signals to the digital system 300, which can direct (re)configuration of the digital system 300 or prompt the digital system 300 to change an operational state. By enabling the analog system 200 to control the configuration of at least part of the digital system 300 or to control the operational states of the digital system 300, the analog system 200 and/or the digital system 300 configured as a digital control device can reduce the processing load of the microcontroller 102.

The core architecture 100 includes a digital system controlled interconnect 320 coupled between the digital system 300 and the analog system 200, which allows the digital system 300 the ability to bi-directionally communicate with the analog system 200. The digital control device can utilize the digital system controlled interconnect 320 to pass commands and data to the analog system 200, and receive operational feedback and possibly data from the analog system 200. Since the digital control device and the digital system controlled interconnect 320 form a closed-loop between the digital system 300 and the analog system 200, the digital system 300 has the ability to direct the (re)configuration of the analog system 200 and control operations performed by the analog system 200. The digital system controlled interconnect 320 allows the digital control device to react in real-time, for example, within two clock cycles, to status indications from the analog system 200, as opposed to an interrupt-based alert and response scheme implemented by the microcontroller 102.

In some embodiments, the analog system 200 can control the digital system 300 through the digital system controlled interconnect 320. For example, the analog system 200 can prompt the digital system 300 to change its operation vary a count range, step size, or sensitivity to various data inputs, or direct a change of states when the digital system 300 implements a state machine.

The analog system 200 can also reconfigure the digital system 300, for example, by providing commands or control signals to the digital system 300. These commands or control signals can be similar to those the microcontroller 102 can provide to the digital system 300 during (re)configuration operations. Since the analog system 200 and digital system 300 can be enabled to reconfigure each other over the digital system controlled interconnect 320, the analog system 200 and the digital system 300 can alleviate the load from the microcontroller 102.

The digital system controlled interconnect 320 can include control connections, status connections, and data connections between the digital system 300 and the analog system 200. The digital system 300 can utilize the control connections to provide the analog system 200 with clocking information, a start trigger, dynamic mode controls, and dynamic routing controls, etc. The analog system 200 can utilize the status connections to provide the digital system 300 with various signals corresponding to the performance of operations by the analog system 200. For instance, the analog system 200 can provide process complete signals, comparator signals, etc, to the digital system 300 during the performance of various applications. The digital system 300 can utilize the data connections to exchange data with the analog system 200. For instance, in a digital-to-analog conversion application, the digital system 300 can provide digital data to the analog system 200 for conversion. When in an analog-to-digital conversion application, the analog system 200 can provide the output of the analog-to-digital conversion back to the digital system 300.

The digital system 300 can be configured into the digital control device responsive to configuration data stored in the memory device of the special functions block 136. This configuration data can be provided to the digital system 300 through one or more direct memory access (DMA) operations with the DMA controller 120, for example, via one or more buses. The use of the DMA controller 120 to provide the configuration data to the digital system 300 can allow the digital system 300 to begin controlling the configuration and operation of the analog system 200 and the digital system 300 upon boot of the core architecture 100 before the microcontroller 102 is initialized and available to control the analog system 200 and the digital system 300. In some embodiments, the digital system 300 can be configured into the digital control device based on configuration data received from the microcontroller 102, for example, via one or more buses. Embodiments of the analog system 200, digital system 300, and the digital system controlled interconnect 320 will be described below in greater detail.

Figure 2:
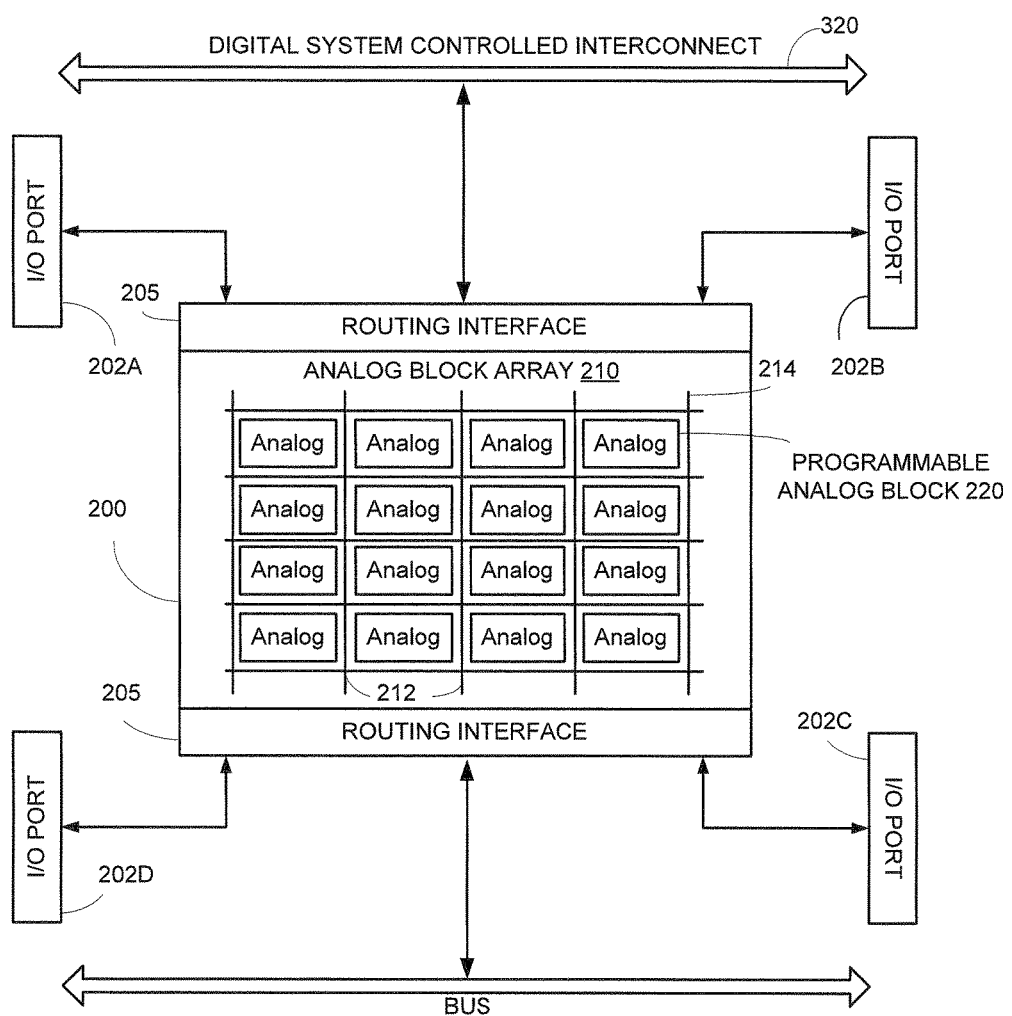
FIG. 2 is a block diagram example of the analog system shown in FIG. 1.

FIG. 2 is a block diagram example of the analog system 200 shown in FIG. 1. Referring to FIG. 2, the analog system 200 includes an analog block array 210 having a plurality of reconfigurable analog circuits (not shown) that can be utilized individually or be variously combined to implement analog or mixed-signal applications. The analog block array 210 includes multiple programmable analog blocks 220 that each can be (re)configured by the digital system 300 (or microcontroller 102) to implement discrete-time functions or continuous-time functions.

The analog system 200 includes routing interfaces 205 to connect the Chub 116 and/or microcontroller 102, the digital system 300, and other fixed function peripherals to the analog block array 210. The analog block array 210 can include a programmable interconnect matrix 212 and 214 that connects together different programmable analog blocks 220. The routing interfaces 205 can be an extension of the interconnect matrix 212 and 214, for example, at the top and bottom of the analog block array 210. The routing interfaces 205 can couple to various buses and the digital system controlled interconnect 320.

The interconnect matrix 212 and 214 and the routing interfaces 205 can combine to provide data, voltages, configuration signaling, etc, to the programmable analog blocks 220 from various on-chip devices and possibly from external resources via I/O ports 202A-202D. The interconnect matrix 212 and 214 can also allow the programmable analog blocks 220 to send output data or control/status information to other on-chip devices via one or more buses or digital system controlled interconnect 320 or to external devices via I/O ports 202A-202D, for example, to the microcontroller 102 or the digital system 300.

Figure 3:
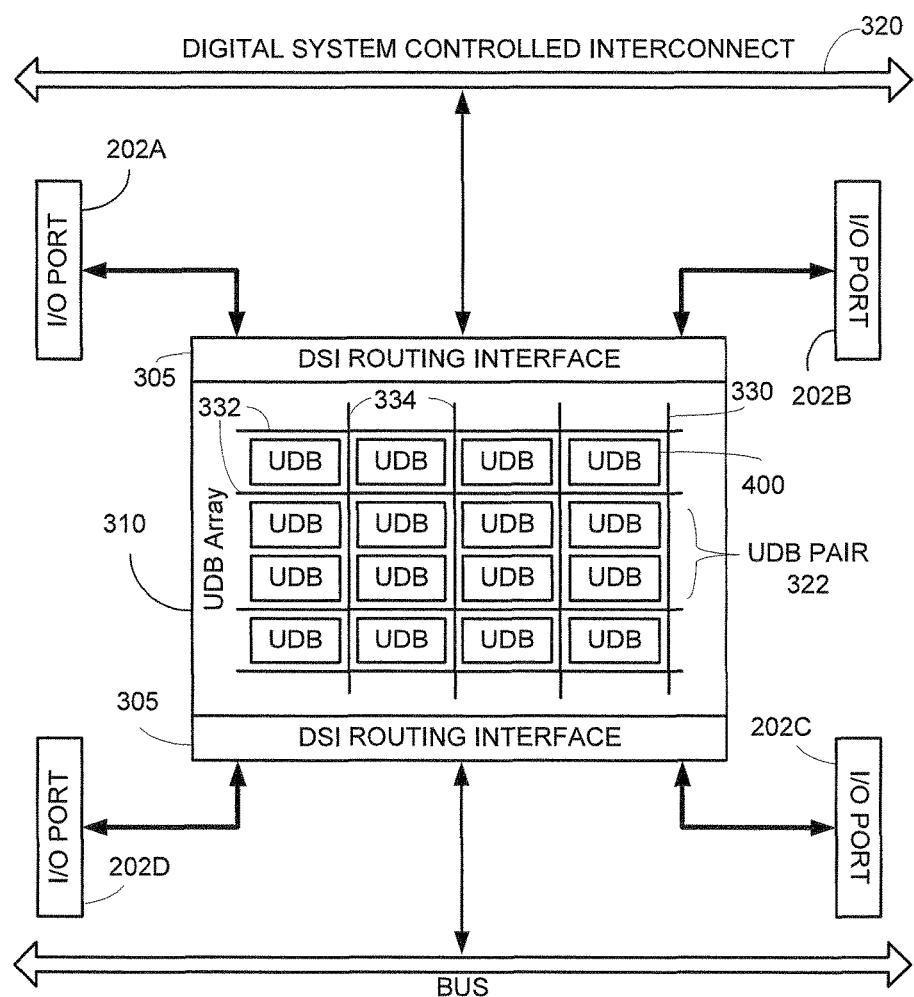
FIG. 3 is a block diagram example of the digital system shown in FIG. 1.

FIG. 3 is a block diagram example of the digital system 300 shown in FIG. 1. Referring to FIG. 3, the digital system 300, in some embodiments, includes a universal digital block (UDB) array 310 having a programmable interconnect matrix 330 that connects together different UDBs 400. The individual UDBs 400 each include a collection of uncommitted logic in the form of Programmable Logic Devices (PLDs) and structural dedicated logic elements that form a datapath shown in more detail in below.

The UDB array 310 can be arranged into UDB pairs 322 that are connected together through the interconnect matrix 330. The UDB pairs 322 each include two UDBs 400 that can be tightly coupled to a shared horizontal routing channel 332. The UDB pairs 322 can also be programmably connected to the horizontal routing channels 332 of other UDB pairs 322 either in the same horizontal row or in different rows through vertical routing channels 334. The horizontal and vertical routing channels and other switching elements are all collectively referred to as the interconnect matrix 330.

A digital routing interface 305 connects the microcontroller 102, the analog system 200, and other system resources to the UDB array 310. The digital routing interface 305 can be an extension of the interconnect matrix 330 at the top and bottom of the UDB array 310. The digital routing interface 305 can couple to various buses and the digital system controlled interconnect 320.

Figure 4:
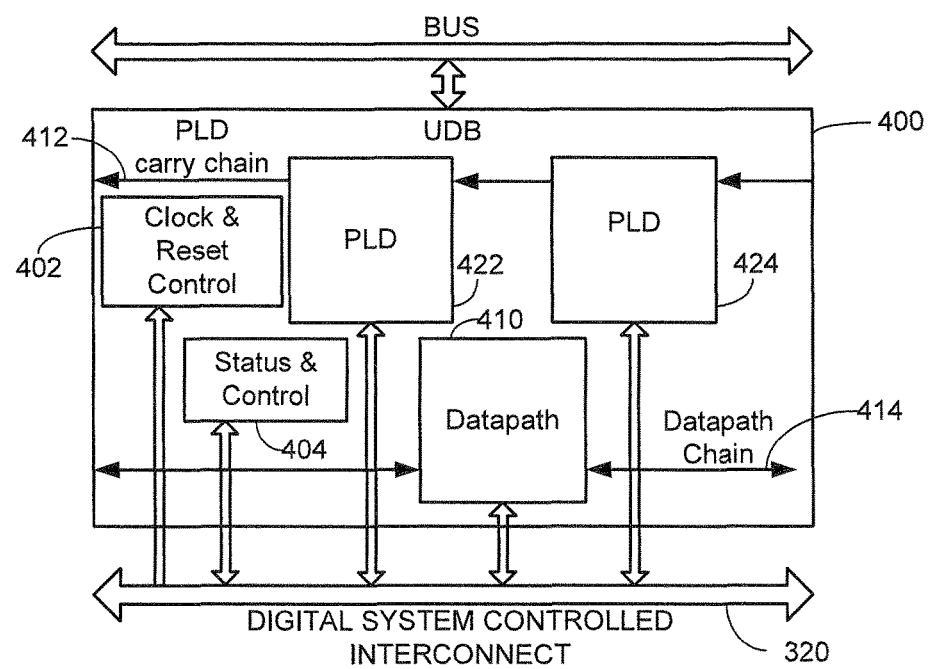
FIG. 4 is a block diagram example of the universal digital block shown in FIG. 3.

FIG. 4 is a block diagram example of the universal digital block 400 shown in FIG. 3. Referring to FIG. 4, the major blocks include a pair of Programmable Logic Devices (PLDs) 422 and 424. The PLDs 422 and 424 can take inputs from the system bus 106 or the digital system controlled interconnect 320 and can form registered or combinational sum-of-products logic to implement state machines, control for datapath operations, conditioning inputs and driving outputs. The PLD blocks 422 and 424 can implement state machines, perform input or output data conditioning, and create look-up tables. The PLDs 422 and 424 can also be configured to perform arithmetic functions, sequence datapath 410, and generate status information.

The datapath block 410 contains highly structured dedicated logic that implements a dynamically programmable arithmetic logic unit (ALU), comparators, and condition generation. A status and control block 404 allows the microcontroller firmware or the digital system 300 (as the digital control device) to interact and synchronize with the UDB 400 by writing to control inputs and reading status outputs. In some embodiments, the digital system 300 can access the status and control block 404 of the UDB 400 through the digital system controlled interconnect 320.

A clock and reset control block 402 can provide global clock selection, enabling, and reset selection for the UDB 400. The clock and reset block 402 can select a clock for each of the PLD blocks 422 and 424, the datapath block 410, and status and control block 404 from available global system clocks, a bus clock, or signaling from the digital system 300 through the digital system controlled interconnect 320. The clock and reset block 402 can also supply dynamic and firmware resets to the UDBs 400.

A routing channel connects to UDB I/O through a programmable switch matrix and provides connections between the different elements of the UDBs 400 in FIG. 2. An interface to the bus or the digital system controlled interconnect 320 can map registers and memory in the UDBs 400 into a system address space and are accessible by the microcontroller 102 or the digital system 300 through the digital system controlled interconnect 320.

The PLDs 422 and 424 and the datapath 410 have chaining signals 412 and 414, respectively, which enable neighboring UDBs 400 to be linked to create higher precision functions. The PLD carry chain signals 412 are routed from the previous adjacent UDB 400 in the chain, and routed through each macrocell in both of the PLDs 422 and 424. The carry out can then be routed to the next UDB 400 in the chain. A similar connectivity can be provided for the set of conditional signals generated by the datapath chain 414 between datapaths 410 in adjacent UDBs 400.

Figure 5:
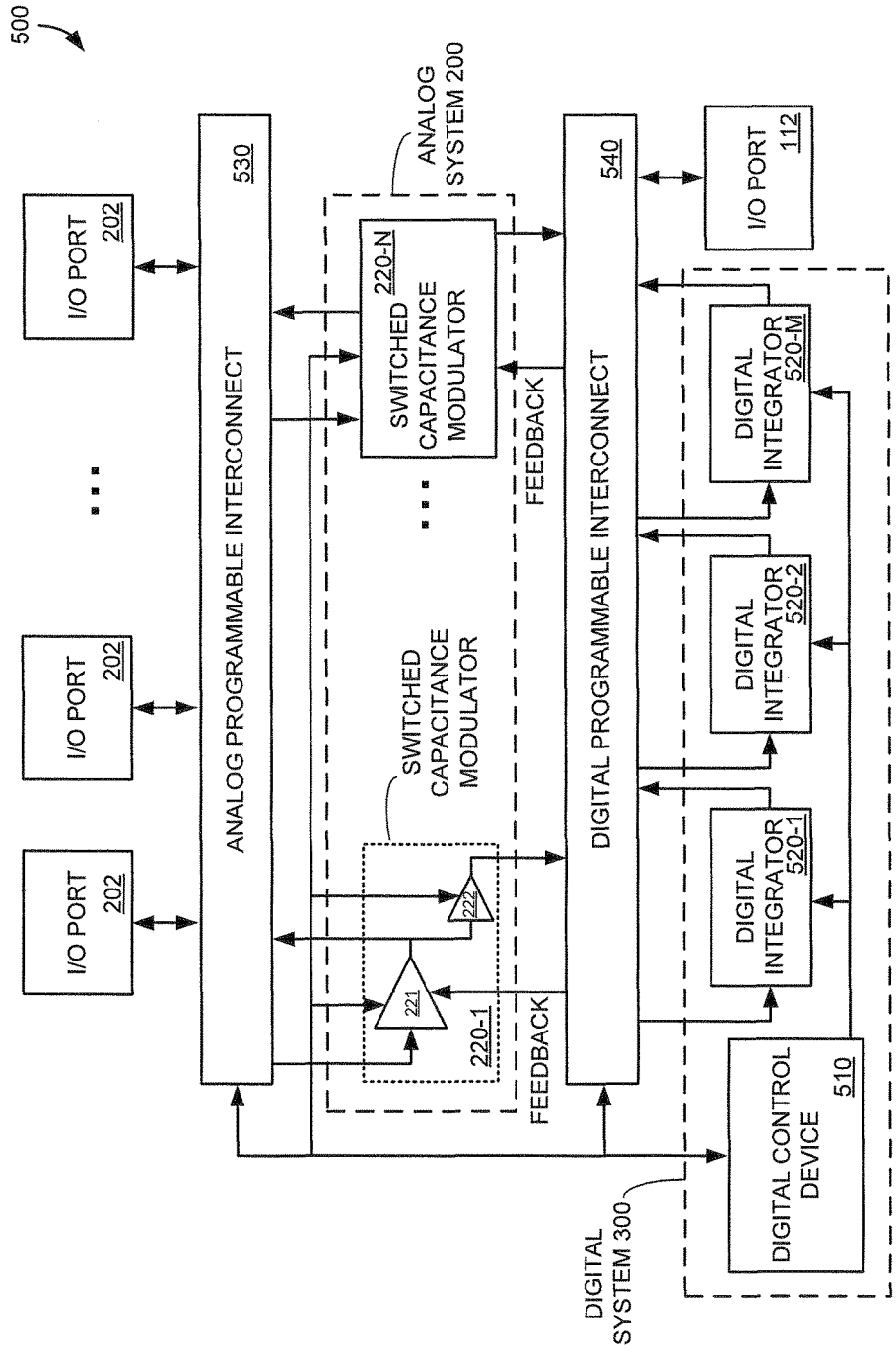
FIG. 5 is another block diagram example of a programmable system with autonomous digital system control according to embodiments of the invention.

FIG. 5 is another block diagram example of a programmable system 500 with autonomous digital system control according to embodiments of the invention. Referring to FIG. 5, the programmable system 500 includes a digital system 300 with one or more programmable digital blocks having been configured to implement a digital control device 510. The digital system 300 can be configured to implement the digital control device 510 based on configuration data provided to the digital system 300 via a DMA controller 120. By using a DMA controller 120 to provide the configuration data to the digital system 300, the programmable system 500 can configure the digital system 300 autonomously of the microcontroller 102. Although this autonomous configuration of the digital system 300 can reduce the consumption of processing resources and also allow the digital system 300 begin performing operations more quickly after a system boot, as the digital system 300 does not have to wait for firmware initiation before being configured, in some embodiments, the microcontroller 102 can provide the configuration data to the digital system 300.

The digital control device 510 can configure the analog system 200 and the digital system 300 to perform various analog, digital, and mixed-signal applications, including an analog-to-digital conversion as shown in FIG. 5, and control the analog system 200 and the digital system 300 during the performance of the application. In an analog-to-digital converter configuration, a plurality of analog blocks 220-1 to 220-N in the analog system 200 are configured by the digital control device 510 into switch capacitance modulators, and a plurality of digital blocks 520-1 to 520-M in the digital system are configured into digital integrators. In some embodiments, the switch capacitance modulators can each include an operational amplifier 221, a comparator 220, and a capacitance network (not shown) to perform the modulations for the analog-to-digital conversion.

The digital control device 510 can direct the configuration of the analog blocks 220-1 to 220-N into switch capacitance modulators by passing commands and/or data to the analog system 200 over the analog programmable interconnect 530 or the digital programmable interconnect 540. The analog programmable interconnect 530 can be reconfigured by the digital control device 510 to route analog data and signals from I/O ports 202 or between the analog blocks 220. The reconfigurability of the analog programmable interconnect 530 allows the digital control device 510, and in some embodiments, the microcontroller 102, the ability to configure the routing of the analog programmable interconnect 530 based on the particular application performed by the programmable system 500. The digital programmable interconnect 540 can route digital data, commands, and signals between the digital system 300 and the analog system 200. In some embodiments, the analog programmable interconnect 530 and the digital programmable interconnect 540 comprise the digital system controlled interconnect 320 shown in FIG. 1.

Once the analog system 200 and digital system 300 are configured to peform analog-to-digital conversion, the digital control device 510 can direct analog data be provided to the analog system 200, for example, from one or more I/O ports 202 via the analog programmable interconnect 530. The switch capacitance modulators can be configured to modulate the analog data and provide the modulated data to the digital integrators 520-1 to 520-M over the digital programmable interconnect 540.

In some embodiments, the digital control device 510 can direct analog data to be provided to an input terminal of the operational amplifier 221 and/or the capacitor network in the switch capacitance modulators. The operational amplifier 221 can generate an output, which can be supplied to the analog programmable interconnect 530 for use by the digital control device 510 and fed to the comparator 222 for comparison against a known reference voltage. Based on the operation of the switch capacitance modulators, the digital control device 510 can provide feedback to the operational amplifier 221 of the switch capacitance modulators, adjusting the generation of the output from the analog data. This feedback can be provided in real-time by the digital control device 510 in response to status signaling that the digital control device 510 receives from the switch capacitance modulators over either the analog programmable interconnect 530 or the digital programmable interconnect 540.

The digital integrators 520-1 to 520-M can receive and integrate digital data, such as the output of the comparator 222, over the digital programmable interconnect 540. The digital control device 510 can control the digital integrators 520-1 to 520-M and other digital blocks in the digital system 300 to provide a digital data output to a selected output, such as an I/O port 202 coupled to the digital programmable interconnect 540. In some embodiments, the analog system 200 can provide commands or control signals to the digital system 300 through either the analog programmable interconnect 530 or the digital programmable interconnect 540. These commands or control signals can direct (re)configuration of the digital system 300 or prompt the digital system 300 to change an operational state. For example, the analog system 200 can provide control signals to the digital system 300 that direct the digital system 300 to configure into the series of digital integrators 520-1 to 520-M. In some embodiments, the control signals provided by the analog system 200 can direct the digital system 300 to alter its operational state while in its current configuration.

Figure 6:
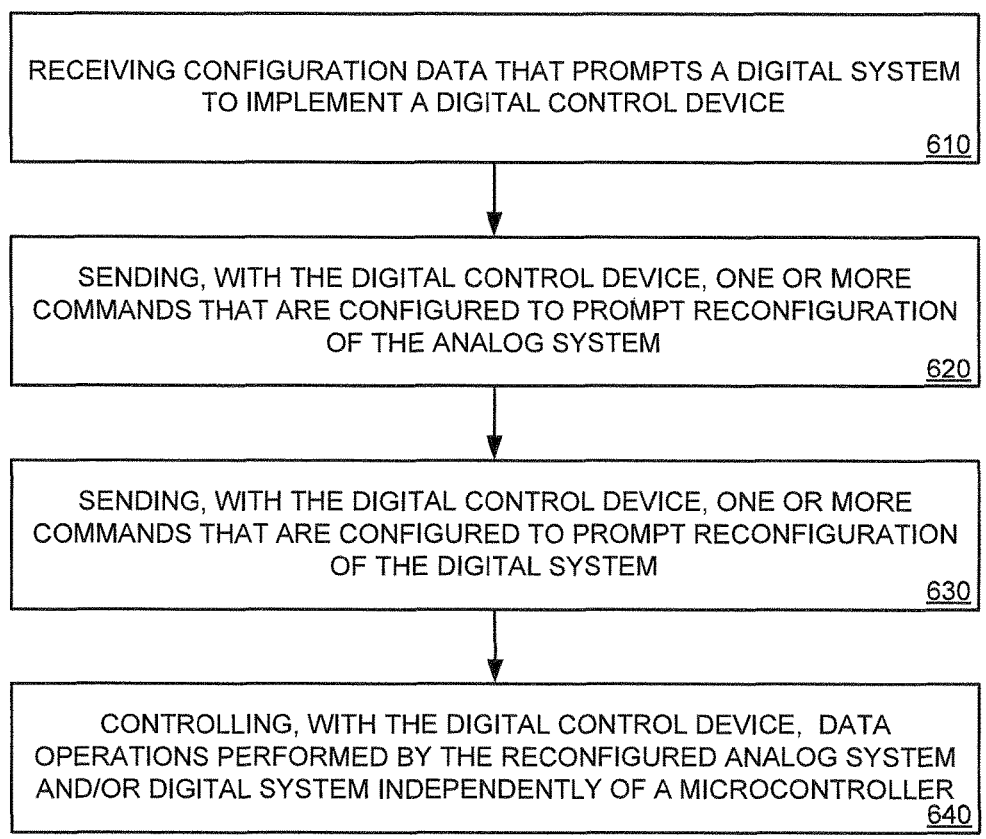
FIG. 6 is an example operational flowchart of the programmable system on a chip according to embodiments of the invention.

FIG. 6 is an example operational flowchart of the programmable system on a chip according to embodiments of the invention. Referring to FIG. 6, in a block 610, the digital system 300 can be configured to receive configuration data 137 that prompts the digital system 300 to implement a digital control device 510. The digital system 300 can be configured to implement the digital control device 510 based on configuration data provided to the digital system 300 via the DMA controller 120 or by the microcontroller 102. When receiving the configuration data from the DMA controller 120 after a system boot of the programmable system, the digital system 300 can be configured autonomously of the microcontroller 102 and before firmware corresponding to the microcontroller 102 is fully initiated.

In block 620 and 630, the digital control device 510 can be configured to send one or more commands that are configured to prompt reconfiguration of the analog system 200 and the digital system 300, respectively. Based on the application that the digital control device 510 intends to initiate, i.e., analog application, digital application, or mixed-signal application, the digital control device 510 can send commands to the analog system 200 and/or the digital system 300. For instance, when implementing a mixed-signal application, the digital control device 510 can send commands to both the analog system 200 and the digital system 300. When, however, implementing an analog application, the digital control device 510 can send commands to the analog system 200 without sending the commands to the digital system 300, as the digital system 300 may not be utilized to implement to the analog application.

In a block 640, the digital control device 510 can be configured to control data operations performed by the (re)configured analog system 200 and/or digital system 300 independently of the microcontroller 102. The digital control device 510 can utilize an interconnect coupled between the analog system 200 and digital system 300 to control the operations performed by the analog system 200 and digital system 300. The interconnect can be controlled by the digital system 300 and be utilized by the digital control device 510 to provide data and commands to the analog system 200 and to receive status signaling and data from the analog system 200. During the performance of some applications, the digital control device 510 can react to the status signaling provided by the analog system 200 in real-time and provide control feedback to the analog system 200 over the interconnect, allowing for increased throughput and system performance.

One of skill in the art will recognize that the concepts taught herein can be tailored to a particular application in many other ways. In particular, those skilled in the art will recognize that the illustrated embodiments are but one of many alternative implementations that will become apparent upon reading this disclosure.

The preceding embodiments are examples. Although the specification may refer to "an", "one", "another", or "some" embodiment(s) in several locations, this does not necessarily mean that each such reference is to the same embodiment(s), or that the feature only applies to a single embodiment.

What is claimed is:

1. A system comprising:
a plurality of configurable analog circuits that is reconfigurable to provide a plurality of analog functions;
a storage device;
a plurality configurable digital circuits coupled to the storage device;
a microcontroller including a CPU configured to couple with the plurality of configurable analog circuits and the plurality of configurable digital circuits, wherein the plurality of digital circuits is configured to reconfigure the plurality of configurable analog circuits, without using the CPU of the microcontroller, to provide the plurality of analog functions; and
a configurable interconnect that is reconfigurable to:
route analog data between a first set of two or more configurable analog circuits, of the plurality of configurable analog circuits, to provide a first analog function, of the plurality of analog functions, and
route analog data between a second set of two or more configurable analog circuits, of the plurality of configurable analog circuits, to provide a second analog function, of the plurality of analog functions.

2. The system of claim 1, wherein the microcontroller is configured to reconfigure the plurality of configurable digital circuits to provide a plurality of digital functions.

3. The system of claim 1, wherein the microcontroller is configured to reconfigure the plurality of configurable analog circuits to provide at least one analog function of a plurality of analog functions.

4. The system of claim 1, wherein the plurality of configurable digital circuits is configured to place a command signal on the configurable interconnect to control at least one analog function of the plurality of analog functions.

5. The system of claim 1, wherein the storage device to store configuration data, wherein the plurality of configurable digital circuits are configured to access configuration data stored in the storage device to reconfigure the plurality of configurable analog circuits.

6. The system of claim 5, wherein the plurality of configurable digital circuits is configured to reconfigure the plurality of configurable analog circuits to provide the plurality of analog functions before firmware corresponding to the microcontroller is fully initiated.

7. The system of claim 5, further comprising a direct memory access engine to retrieve configuration data from the storage device before firmware corresponding to the microcontroller is fully initiated and provide the configuration data to the plurality of configurable digital circuits to reconfigure the plurality of configurable analog circuits.

8. The system of claim 1, wherein the plurality of configurable digital circuits is configured to direct the plurality of configurable analog circuits and the plurality of configurable digital circuits to implement at least one mixed-signal application without using the microcontroller.

9. A method comprising:
providing a first analog function using a plurality of configurable analog circuits;
providing a digital function using a plurality of configurable digital circuits; and
using the plurality of configurable digital circuits, reconfiguring the plurality of configurable analog circuits to provide a second analog function, independent of a microcontroller configured to be coupled with the plurality of configurable analog circuits and the plurality of configurable digital circuits, wherein the providing of the first analog function comprises using a reconfigurable analog interconnect, routing analog data between a first set of two or more configurable analog circuits, of the plurality of configurable analog circuits, to provide the first analog function, and the providing of the second analog function comprises routing analog data between a second set of two or more configurable analog circuits, of the plurality of analog circuits, to provide the second analog function.

10. The method of claim 9, further comprising:
placing a command signal on a reconfigurable interconnect using the plurality of configurable digital circuits; and
controlling at least one analog function of the plurality of analog functions, using the plurality of configurable digital circuits.

11. The method of claim 9, wherein the reconfiguring of the plurality of configurable analog circuits comprises accessing configuration data stored in a storage device to reconfigure the plurality of configurable analog circuits.

12. The method of claim 11, wherein the accessing of the configuration data comprises using a direct memory access engine to retrieve the configuration data from the storage device and to provide the configuration data to the plurality of configurable digital circuits to reconfigure the plurality of configurable analog circuits.

13. The method of claim 9, wherein the reconfiguring the plurality of configurable analog circuits to provide the second analog function, independent of the microcontroller, comprises using the plurality of configurable digital circuits, directing the plurality of configurable analog circuits and the plurality of configurable digital circuits to implement at least one mixed-signal application without using the microcontroller.

* * * * *